United States Patent [19]

Hodgkin et al.

[11] Patent Number: 4,762,556
[45] Date of Patent: Aug. 9, 1988

[54] SELECTIVE EXTRACTION OF GOLD

[75] Inventors: Jonathan H. Hodgkin, Burwood; Robert Eibl, Little River, both of Australia

[73] Assignee: Commonwealth Scientific and Industrial Research Organization, Campbell, Australia

[21] Appl. No.: 285,926

[22] Filed: Jul. 23, 1981

[30] Foreign Application Priority Data

Aug. 7, 1980 [AU] Australia .................. PE 4953/80

[51] Int. Cl.⁴ ............................................. C22B 11/04
[52] U.S. Cl. .............................. 75/118 R; 75/101 BE; 210/673; 423/24; 423/DIG. 14
[58] Field of Search ........................ 423/24, DIG. 14; 521/27, 38; 210/673; 75/101 BE, 118 R

[56] References Cited

U.S. PATENT DOCUMENTS

| | | | |
|---|---|---|---|
| 2,753,258 | 7/1956 | Burstall | 423/24 |
| 2,839,389 | 6/1958 | Kember | 423/24 |
| 3,001,868 | 9/1961 | Aveston | 423/24 |
| 3,619,394 | 11/1971 | Battaerd | 521/29 |
| 3,716,481 | 2/1973 | Battaerd | 521/38 |
| 4,168,971 | 9/1979 | Szczepanski | 75/118 R |

FOREIGN PATENT DOCUMENTS 480922  2/1977  Australia .

OTHER PUBLICATIONS

Sykova, Dubsky and Folprechtova, Chemical Abstracts, 94: 76076R.
Yannapolous, Ed., *Extractive Metallurgy of Copper*, vol. II, pp. 1009, AIME, N.Y. (1976).
Burstall, *Ind. Eng. Chem.*, 45 (1953) p. 1648.
Wells et al., *J. Applied Chem.*, 8, (1958) p. 77.
Aveston, *J. Chem. Soc.*, (1958) p. 231.
Butler, *J. Am. Chem. Soc.*, 80, (1958), p. 3615.

*Primary Examiner*—Robert L. Stoll
*Attorney, Agent, or Firm*—Bacon & Thomas

[57] ABSTRACT

Gold is selectively extracted from an aqueous solution by contacting the gold-containing solution, which may contain other metals, with a resin which is a diallylamine homopolymer or copolymer, and then separating the resin from the solution.

15 Claims, No Drawings

SELECTIVE EXTRACTION OF GOLD

This invention provides a method for the selective removal of gold containing ions from aqueous solutions using a synthetic organic polymer. The method is particularly useful for the removal of gold from waste electroplating solutions or hydrometallurgical liquors which contain many other contaminating metals.

Use of ion-exchange resins for the removal of metal ions from aqueous solutions is commercially widespread; especially in water softening applications and for the removal of toxic products from effluents. Other areas of importance are in the processing of radioactive wastes, the purification of rare earth metals and the analysis of geological samples. Many other areas of commercial exploitation of this type of technology on a large scale have not been possible in the past because of both the cost of available resins and the lack of resin selectivity.

Recently more selective chelating resins have become available commercially, for example the imidodiacetic acid resins of the Dowex A-1 and Chelex 100 type ("Dowex" and "Chelex" are registered trademarks). However, these resins are only marginally selective for a particular heavy metal ion and require complex procedures to affect practical separations in commercial situations. Much more selective chelating resins have been reported for some metal ions, for example copper: R. R. Grinstead et al., in "Extractive metallurgy of Copper" Vol. 2. Yannapolous and Agarwal Eds. (1976), AIME, New York p. 1009, and iron; R. S. Ramirez and J. D. Andrade, *J. Macromol. Sci. - Chem.*, A10, 309 (1976). For a review of this type of material see C. Calmon, *Ion. Exch. Pollut. Control*, 2, 151 (1979).

As far as gold is concerned there has always been a strong interest in the removal of this metal from aqueous solutions both for commercial and analytical reasons and many resin systems have been designed to accomplish this. In the analytical area a very common polymer used has been the Srafion NMRR resin (Ayalon Water Conditioning Co. Ltd., Haifa, Israel) which has an aromatic sulphaguanidine structure. Although it has good capacity for gold in acidic solutions (>5 mmoles/g) it absorbs most of the other heavy metals as well, e.g., T. E. Geen, S. L. Law and W. J. Campbell, *Anal. Chem.*, 42, 1749 (1970). Another commonly used analytical resin has been the iminodiacetic acid chelating resin as mentioned above. Although these can be used relatively selectively in some cases, e.g., L. L. Sundberg, *Anal. Chem.*, 47, 2037 (1975), because they can adsorb many other metals as well, the possibilities for using them selectively are limited.

The resins mentioned above and others that have been synthesized are all made by carrying out a number of reactions on preformed crosslinked polystyrene (or other polymer) and hence are relatively expensive. This means that in a large scale commercial application, where gold would advantageously be recovered by burning off the resin, the costs are prohibitive. In these cases a common anion exchange resin such as Amberlite IRA 400 is used. These materials are generally not at all selective, consequently recovery of pure gold from them requires a complex series of selective elutions to remove the other metals e.g., F. H. Burstall, P. J. Forrest, N. F. Kember and R. A. Wells, *Ind. Eng. Chem.*, 45, 1648 (1953). Their capacity is also not very high, being about 1–2 mmole of gold per gram of resin. More selective weak base resins have been produced, e.g., J. Aveston, D. A. Everest, N. F. Kember and R. A. Wells, *Journal of Applied Chemistry* 8, 77 (1958), but their capacity is much lower and they suffer from interference from sulphur-containing anions. Combinations of weak and strong base resins have also been tried with no significant advantage (J. Aveston, D. H. Everest and R. A. Wells, *Journal of the Chemical Society* 1958, 231).

According to the present invention there is provided a method for the selective extraction of gold from an aqueous solution which comprises contacting the gold-containing solution with a resin which is a diallylamine homopolymer or copolymer and then separating the resin from the solution.

The preferred copolymers comprise a major proportion of diallylamine. The resins may be linear or crosslinked. Useful comonomers for producing a suitable crosslinked resin from diallylamine are $\alpha,\omega$-bis(diallylamino) alkanes, especially 1,6-bis(diallylamino) hexane; triallylamine can also be used.

The gold-containing solution may be contacted with the resin in any suitable manner, for example, by passing the solution through a container holding the resin, such as a column of the kind commonly used with ion exchange resins, or by adding the resin to a container holding the gold solution, keeping the resin in contact with the solution (preferably with stirring) for a time sufficient for the gold ions to be adsorbed, then separating the loaded resin from the solution.

Gold recovery from the loaded resin may be carried out either by ashing the resin or by chemical means, e.g., extraction with a suitable reagent.

The resins used in the method of this invention are not ionic (except at low pH). They are chelating resins and so do not absorb monovalent or alkaline earth ions. Moreover, they have been found to have a very high selectivity and capacity for gold over other multivalent ions. They are also very easily and cheaply produced as they are synthesized directly from simple monomers.

Diallylamine (as its acid salt) has been polymerized previously either by itself, (to give a linear polymer, (G. B. Butler, A. Crawshaw and M. L. Milles; *J. Amer. Chem. Soc.*, 80, 3615 (1958) or as a copolymer to form crosslinked resins (Australian Pat. No. 480,922; U.S. Pat. No. 3,957,699). Many methods of producing diallylamine polymers are known, including radiation polymerization and a number of free radical methods. The most useful way we have found to obtain a cross-linked resin is by the titanous chloride/hydrogen peroxide or ferrous sulphate/hydrogen peroxide redox-initiated polymerization of diallylamine hydrochloride containing 5–40 mole % of 1,6-bis(diallylamino)hexane dihydrochloride monomer. Although a crosslinking monomer is required to get a mechanically durable resin, even un-crosslinked water-soluble forms of resin can be used to complex gold in relatively concentrated gold solutions (above about 300 ppm) as the metal complex forms an insoluble heavy precipitate in such cases.

The crosslinked resins described above used in accordance with the present invention will selectively remove gold from dilute solutions containing other metal ions in addition to gold ions. Surprisingly these solutions may be acidic, neutral or basic. Thus the method of this invention is extremely versatile and useful for the recovery of gold for commercial or analytical purposes.

In the separation of gold for analytical purposes, in areas such as the assaying of geological samples, acidic solutions are often used. We have investigated the adsorption of metal and metal-containing ions by the resins from dilute acid solutions containing gold either alone or in the presence of other metals or mixtures of other metals. The other metals used in our investigations include cadmium, cobalt, iron, mercury, nickel, lead, platinum, silver, tin and titanium. In all cases investigated only gold was significantly adsorbed. In these tests the gold salt used for comparison was potassium bromoaurate and the gold ions adsorbed on the resin could not be removed even on washing with 2M hydrochloric acid.

Alkaline cyanide solutions of gold salts are very commonly encountered in electroplating solutions and in gold mining operations. The types of impurity metals which may cause problems in these situations are copper, iron, nickel, cadmium, cobalt and silver.

We have found that using the resins described herein, gold ions are selectively adsorbed from cyanide solutions which also contain these metals. Where some apparent adsorption of other metals does occur, further washing with a cyanide solution not containing those metals removes them but not the gold ions from the resins. Substantially pure gold can be obtained from these resins upon ashing of the resin complex.

As far as resin capacity is concerned, in alkaline solutions a typical resin has a gold capacity of 5 mmole/g (dry weight). This capacity can vary with the crosslinking of the resin. In acid solutions the capacity may vary with pH and any other ions present but will generally approach the above figure.

The gold can normally be recovered from the loaded resins (preferably after they have been washed thoroughly with dilute acid or cyanide solution) by ashing the resin complex at about 800° C. The gold also may be recovered in solution by treating the loaded resins with an aqueous 2M hydrochloric acid solution containing 0.5% thiourea.

Although the preferred method of production of the resins used in this process is fully disclosed in Australian Pat. No. 480,922 the following descriptions of the production of resins suitable for this process are provided for ease of reference and to facilitate understanding of our invention.

RESIN A 97.17 g (1 mole) of redistilled diallylamine and 13.8 g (0.05 mole) of 1,6-bis(diallylamino) hexane crosslinker were stirred vigorously while $N_2$ gas was passed through the solution for 1 hour. Then 120 ml (1.2 mole) of concentrated hydrochloric acid was added slowly under nitrogen as the solution was cooled by ice-water. After stirring for 15 minutes the mixture was then transferred to an evaporation flask and approximately 50 mls of water evaporated on a rotary evaporator at 50°-60° C. The mixture was then transferred to the reaction vessel under nitrogen and cooled to 0° C. for 1½ hours with a vigorous nitrogen stream and stirring. Polymerization was accomplished by the addition alternately of a drop of 30% acidic titanous chloride solution and a drop of 30% hydrogen peroxide solution as the mixture was stirred with a powerful air stirrer; all under nitrogen. The solution slowly became more viscous and deeper red until it formed solid lumps of crosslinked resin. The addition of redox initiator was continued until no more solid formed. The crosslinked polymer was purified by washing in a dialysis bag with 10% hydrochloric acid until the colour had changed from red to pale yellow. The solid was then filtered off, washed with distilled water then treated with 20% ammonium hydroxide solution until basic and then rewashed with distilled water and suction dried. Yield 142 g (46% $H_2O$).

RESIN B

The following method produces a resin in bead form suitable for column applications. (All parts are by weight.)

Chlorobenzene (550 parts) containing an ethylacrylate/hydroxyethylmethacrylate copolymer surfactant (Product No. 498-6890, Dulux Pty. Ltd. Australia)(14.3 parts) was stirred in a flask under a stream of nitrogen, the flask being cooled in an ice bath. A solution of ferrous sulphate heptahydrate (3 parts) in water (5 parts) was mixed with an 80% solution of diallylamine sulphate in water (46.75 parts) and a 74% solution of 1,6-bis(diallylamino)hexane in water (21.5 parts) and added to the mixture with vigorous stirring. 30% v/v hydrogen peroxide (6 parts) was then dropped slowly into the stirred emulsion while the reaction temperature was kept at 20° C. by external cooling of the flask with ice. After 2 hours stirring the water bath was warmed to 30° C. for 1 hour and following which the solid product was filtered off and washed with acetone and then water to remove the residual solvent and surfactant.

The invention is further described and elucidated in the following examples. These should not be construed, however, as limiting the invention in any way.

EXAMPLE 1

This example illustrates the gold selectivity of Resin A in acid solutions. One gram of the resin was suspended in 100 ml of 100 ppm solutions of various metals at pH 3, 4 or 5 for 24 hours. The resin was then filtered off and washed with 0.1N hydrochloric acid (100 ml) and the filtrate and washings combined. The metal concentration in solution was determined by atomic absorption spectroscopy and in the resin by ashing at 800° C. The metal salts included: cadmium sulphate, cobalt chloride, ferric sulphate, copper sulphate, nickel sulphate, lead chloride, mercuric chloride, platinum chloride, tin chloride, silver nitrate, titanous chloride (pH 2 only) and potassium bromoaurate. Only the gold showed significant (in this case complete) adsorption. These experiments were repeated with these metals mixed with the gold salt solution and again only the gold was adsorbed.

EXAMPLE 2

This example illustrates the gold selectivity of Resin A in alkaline cyanide solutions. One gram of resin was stirred in 100 ml of a solution containing 100 ppm of copper, cadmium, iron, silver, nickel and gold cyanides in excess potassium cyanide (pH 8) for 24 hours and then washed on a filter with 100 ml of dilute potassium cyanide solution. The metal ion concentration in solution was determined by atomic absorption spectroscopy and in the resin by ashing and redissolving the ash in aqua-regia. Only the gold was adsorbed by the resin, the amount of the other metals in solution remained at the equivalent of 100 ppm. Some silver precipitation occurred on the resin under these conditions but it could be redissolved in more concentrated cyanide solutions.

EXAMPLE 3

This example illustrates the gold capacity of Resin A in alkaline cyanide solutions. 0.2 g (dry weight) of the above resin removed all the gold (181.5 mg) from 150 ml of a solution containing 1.21 g Au/l as the cyanide at pH 8.5 when left overnight in the solution. This represents a capacity of 4.61 m mole of gold per gram of resin.

EXAMPLE 4

This example demonstrates the gold loadings which can be achieved. Resin B was used in air-dried form; it was still fairly damp.

Tests were conducted using a spent commercial plating solution having the following composition:

| | |
|---|---|
| Au | 3.2 gl$^{-1}$ |
| KCN | 0.8 gl$^{-1}$ |
| Ni | 527 mgl$^{-1}$ |
| Fe | 40 mgl$^{-1}$ |
| Pb | 6.6 mgl$^{-1}$ |
| Co | 4.4 mgl$^{-1}$ |

A single 2 g sample of Resin B was contacted (overnight, with shaking) with three successive 50 ml aliquots of the above solution. The amount of gold remaining in each aliquot after contact was determined, and the amount of gold loaded on to the resin calculated from this. The results are shown in the following table.

| Contact No. | Final Conc. of Au in solution (gl$^{-1}$) | Resin loading mgAu/g resin This contact | Cumulative |
|---|---|---|---|
| 1 | 0.62 | 65 | 65 |
| 2 | 1.55 | 41 | 106 |
| 3 | 2.1 | 28 | 134 |

EXAMPLE 5

This example demonstrates the levels of gold removal which can be achieved. Air-dried Resin B was used as described in Example 4. The test solution had the following composition.

| | |
|---|---|
| Au | 160 mgl$^{-1}$ |
| KCN | 40 mgl$^{-1}$ |
| Ni | 26 mgl$^{-1}$ |
| Fe | 2 mgl$^{-1}$ |
| Pb | 0.3 mgl$^{-1}$ |
| Co | 0.2 mgl$^{-1}$ |

A 100 ml sample of this solution was contacted (overnight, with shaking) with 3 successive 5 g aliquots of fresh resin. The gold concentration in the solution was determined after each contact. The results are shown in the following table.

| Contact No. | Au Conc. after contact (mgl$^{-1}$) |
|---|---|
| 0 | 160 |
| 1 | 7.1 |
| 2 | 1.8 |
| 3 | 0.8 |

We claim:

1. A method for the extraction of gold from an aqueous solution containing gold and at least one other metal, characterised in that it comprises contacting the gold-containing solution with a resin which is a diallylamine homopolymer or copolymer to adsorb gold on the resin without significant adsorption of other metals.

2. A method as claimed in claim 1, characterised in that the resin is a copolymer comprising a major proportion of diallylamine.

3. A method as claimed in claim 2, characterised in that the comonomer is an α,ω-bis(diallylamino)alkane or triallylamine.

4. A method as claimed in claim 2, characterised in that the resin is a copolymer comprising a major proportion of diallylamine and a minor proportion of 1,6-bis(diallylamino)hexane.

5. A method as claimed in claim 4, characterised in that the copolymer consists of 5 to 40 mole percent of 1,6-bis(diallylamino)hexane, the balance being diallylamine.

6. A method as claimed in any one of the preceding claims, characterised in that the loaded resin, after contact with and separation from the gold-containing solution is ashed to recover the gold.

7. A method as claimed in any one of claims, 1-5 characterised in that the gold is recovered from the loaded resin by treating it with a solution of aqueous hydrochloric acid and thiourea.

8. A method as claimed in any one of claims 1-5, wherein the method is further characterized by the step of washing the loaded resin with a reagent which substantially removes any traces of the at least one other metal.

9. A method as claimed in claim 8, characterised in that the loaded resin is washed with a cyanide solution which does not contain the said other metal(s).

10. A method as claimed in claim 8 further characterized in that the washed resin is ashed to recover the gold.

11. The method of claim 1 wherein the gold-containing aqueous solution from which the gold is extracted contains at least one other heavy metal.

12. The method of claim 1 wherein the gold-containing aqueous solution from which the gold is extracted contains at least one other metal selected from the group consisting of copper, cadmium, cobalt, iron, mercury, nickel, lead, platinum, silver, tin, and titanium.

13. A method for the extraction of gold from an alkaline cyanide solution containing copper, cadmium, iron, silver, nickel and gold cyanides comprising contacting said solution with a cross-linked resin copolymer comprising a major proportion of diallylamine and a minor proportion of 1,6-bis(diallylamino)hexane to adsorb only the gold on the resin and then separating the resin from the solution.

14. A method for the extraction of gold from an acidic solution containing at least one metal ion selected from the group consisting of cadmium, cobalt, iron, copper, nickel, lead, mercury, platinum, tin, silver and titanium in addition to gold ions, comprising contacting said solution with a cross-linked resin copolymer comprising a major proportion of diallylamine and a minor proportion of 1,6-bis(diallylamino)hexane to adsorb only the gold on the resin and then separating the resin from the solution.

15. A method for the extraction of gold from an aqueous solution containing gold and at least one other metal, characterised in that it comprises contacting the gold-containing solution with a resin which is a diallylamine homopolymer or copolymer to absorb only the gold on the resin and then separating the resin from the solution.

* * * * *